Figure 1:
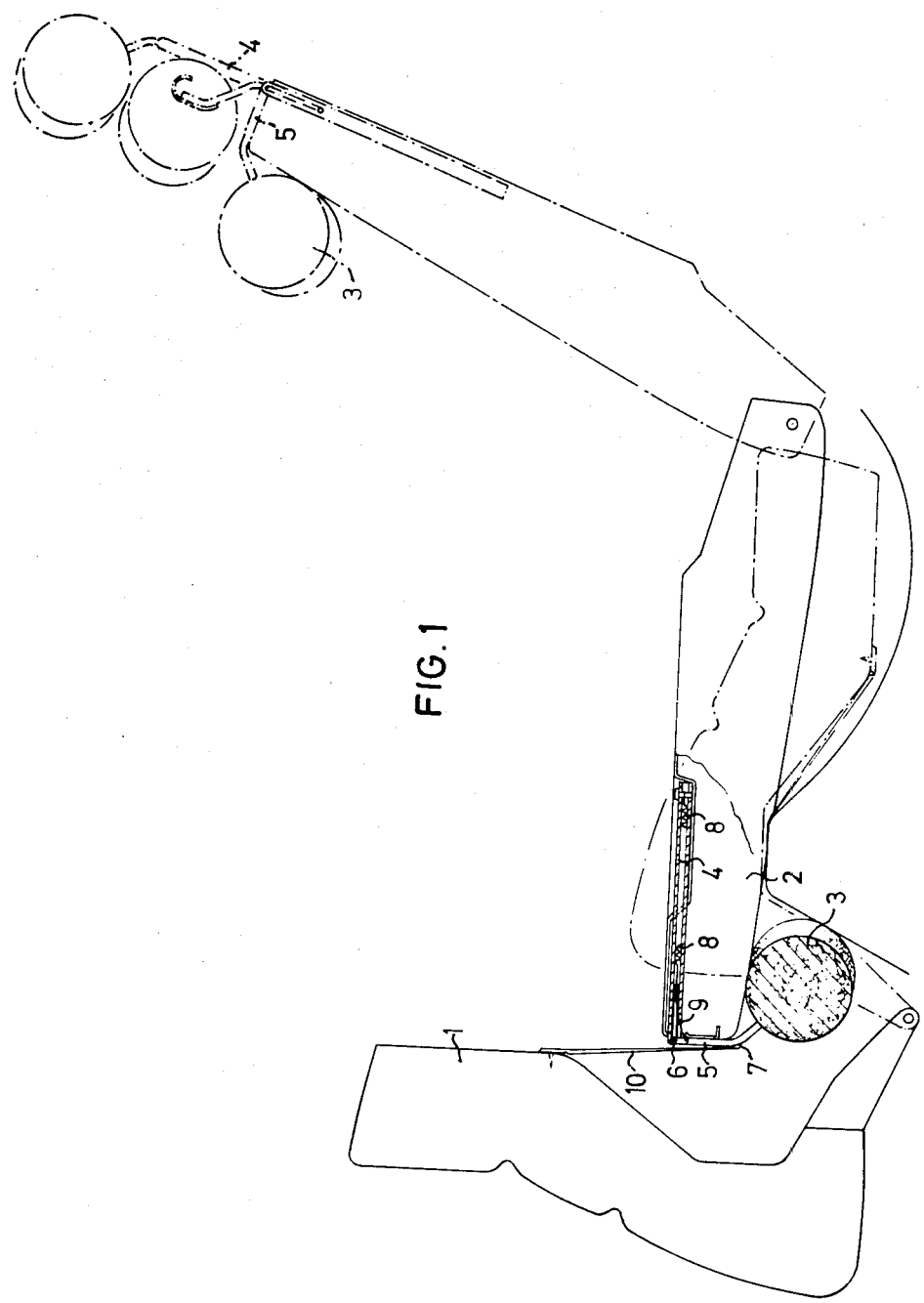

United States Patent [19]

Pilhall

[11] 4,376,552
[45] Mar. 15, 1983

[54] BACK SEAT HEADREST
[75] Inventor: Stig T. L. Pilhall, Trollhättan, Sweden
[73] Assignee: AB Volvo, Gothenburg, Sweden
[21] Appl. No.: 231,154
[22] Filed: Feb. 3, 1981
[30] Foreign Application Priority Data
Feb. 15, 1980 [SE] Sweden ................................ 8001219
[51] Int. Cl.³ .............................................. A47C 1/10
[52] U.S. Cl. ..................................... 297/391; 296/69; 297/118; 297/379
[58] Field of Search ............... 297/378, 379, 391, 403, 297/404, 408, 234, 331, 118; 296/69, 65 R
[56] References Cited
U.S. PATENT DOCUMENTS

| 722,950 | 3/1903 | Deardruff | 297/408 |
| 1,310,581 | 7/1919 | Russo | 297/403 X |
| 2,307,621 | 1/1943 | Dorton | 297/403 X |
| 2,765,840 | 10/1956 | Robert et al. | 297/403 |
| 3,265,437 | 8/1966 | Wincieli | 297/378 |
| 3,449,012 | 6/1969 | Caron | 297/378 X |

FOREIGN PATENT DOCUMENTS

| 940546 | 3/1956 | Fed. Rep. of Germany | 297/408 |
| 1680100 | 8/1970 | Fed. Rep. of Germany | 297/408 |
| 1680254 | 9/1971 | Fed. Rep. of Germany | |
| 402255 | 6/1978 | Sweden | |
| 1439278 | 6/1976 | United Kingdom | 297/408 |

Primary Examiner—James T. McCall
Attorney, Agent, or Firm—Young & Thompson

[57] ABSTRACT

A headrest for back seats in station wagons arranged on a forwardly foldable seat back is arranged on or is integrated with an arm pivotally arranged at the top, rear edge of the back seat, to be swung out of the way from a use position to a stowage position beneath the seat back when the seat back is folded down. The arm can be articulated and be slidably arranged in a sleeve mounted on the rear side of the seat back. When the headrest is in the stowage position, the seat back can be folded forwards and the headrest will be well-protected and out of the way in the cavity under the seat back which would otherwise be unused.

5 Claims, 2 Drawing Figures

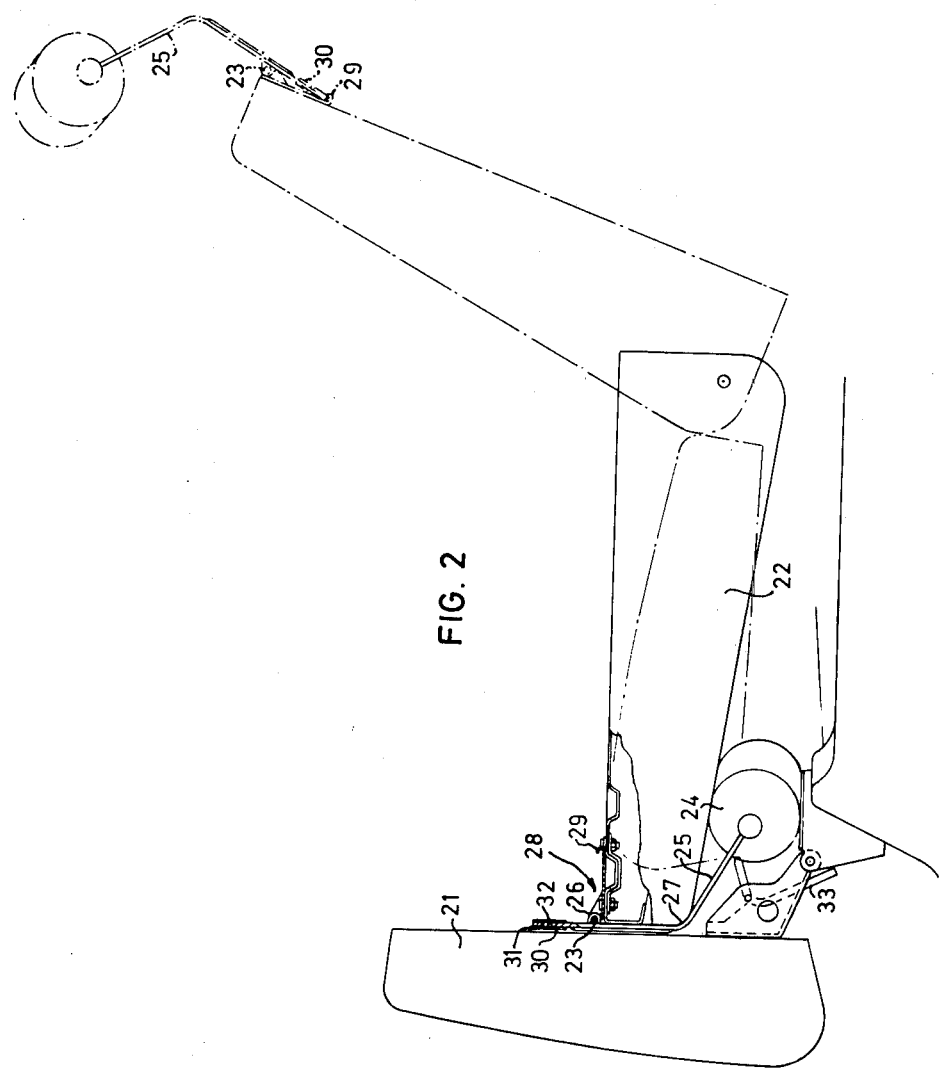

BACK SEAT HEADREST

The present invention relates to a headrest for back seats in station wagons, which is pivotally arranged on a forwardly foldable seat back so that the back seat can be easily transformed into a cargo space.

In most of today's station wagons the back seat passengers cannot be provided with satisfactory protection if the vehicle is struck from behind. There are no neck-protecting headrests since they would make the transformation into the cargo position more difficult and possibly be damaged by the cargo.

A number of attempts have been made in this area, but without appreciable success. Traditional headrests have been inserted into guide sleeves on the upper edge of the seat back. The disadvantage of this is that such a headrest must be lifted off and placed somewhere, so that it may obstruct vision or become damaged or soiled.

Another alternative has been to divide the upper edge of the seat back so that it can be pulled up as a headrest. However, this weakens and complicates the load-carrying beam in the upper portion of the seat back. It also complicates the upholstering of the seat back and provides poorer support for the upper portion of the back. Also, this type of headrest cannot be mounted afterwards, but the seat back must either be made for or completely without these headrests.

Finally, headrests have also been developed which can be mounted on the ceiling, and which can be swung up. It is however difficult to achieve stable anchoring in the ceiling. Even when swung up, they are visible and can be in the way of a bulky cargo.

The purpose of the present invention is to achieve a back seat headrest which can be easily moved to the cargo position, in which it is completely out of the way and protected, which can be easily subsequently mounted and which must be used, i.e. folded out, by the passenger who is to use the seat.

This is achieved by means of the present invention which is characterized in that the headrest is mounted on or is integrated with an arm which is pivotally arranged at the upper, rear edge of the seat back to be swung out of the way from a position for use to a stowage position beneath the seat back when it is folded down.

The invention will be described below in more detail with reference to the accompanying drawings, of which FIGS. 1 and 2 show partially cross-sectional side elevation view of two different embodiments of a headrest according to the invention.

FIG. 1 shows a back seat in a station wagon in the cargo position. The seat bottom 1 is folded forward and the seat back 2 is folded down. The headrest 3 is shown with solid lines in the stowage position, i.e. folded down under the folded-down seat back. On the back of the seat back a sleeve 4 is attached which is preferably a square pipe. The headrest 3 is mounted on or is integrated with an arm 5. This arm 5 is divided at a joint 6. The part of the arm between the headrest and the joint is angled at 7 so that when the headrest is in the position for use, its contact surface is in front of the seat back 2. By virtue of the angle, the arm can also easily be made resilient. A pull spring 8 is attached above the joint 6 to the arm 5 and to the lower portion of the sleeve 4. This pull spring acts to pull the arm 5 down into the sleeve 4.

The headrest 3 is moved to the stowage position by lifting the arm 5 out of the sleeve so far that the joint 6 comes outside the edge of the seat back, whereafter the arm can be folded 90°. Via a groove 9 or bevelling, the spring 8 or its extension can pass the upper, rear edge of the seat back and hold the headrest in its stowage position.

Due to the angling of the arm at 7, the headrest 3 when in the stowage position will be below the top edge of the seat back, or only insignificantly above it. This is necessary in most cases since the top edge of the seat back will abut either the underside of the seat cushion or a support plate 10 on the bottom. The actual seat construction however does not fall within the scope of the invention. Rather, the invention can be used in all seat constructions which use a forwardly foldable seat back and a fold-up seat cushion, and where a space is formed under the seat back which can house a headrest.

FIG. 2 shows another embodiment of the headrest according to the invention arranged on a back seat made in a somewhat different manner than the back seat in FIG. 1.

In FIG. 2, the seat cushion 21 is folded forward and the seat back 22 is folded down. At the top, rear edge of the seat back, a shaft 23 is arranged around which an arm 25 can swing which is joined to a headrest 24. For example, ears 26 can be arranged on the arm 25 for mounting on the shaft 23. The arm 25 is angled at 27 and the headrest 24 is joined to the arm 25 in a suitable manner, or it can be made in one piece with the arm.

The shaft 23 can suitably be a part of an anchoring arrangement 28 screwed securely to the rear side of the seat back. The anchoring arrangement 28 also comprises a catch plate 29 which functions as a catch. A tube 30 with a tongue 31 is arranged at the free end of the arm 25. The tube can be suitably spring-loaded so that it is pressed towards the end of the arm. It can be attached to the arm by means of a bolt 32 running in a groove in the arm 25. When the headrest is in the position for use, the tongue 31 locks the arm. To release the headrest for folding down 90° into the stowage position, the tube is pushed with a simple movement up on the arm so that the tongue is freed from the catch plate.

The arm 25 can also be spring-loaded at the shaft 23, by a leaf spring for example. When the tube tongue 31 is not held by the catch plate 29, the headrest 24 will be moved to the stowage position and kept there.

The angle at 27 of the arm 25 is such that the headrest 24 will be beneath the top, rear edge of the seat back, and in any case so far back as to be free of the catch arrangement 33 for the seat cushion. In the folded-down position, the arm will abut against the underside of the seat cushion.

Common to these two embodiments of the headrest according to the invention is that they can be easily subsequently mounted by screwing them onto the rear side of the seat back. Furthermore, the headrests must be folded up into the use position if the seat is to be used.

In the embodiment according to FIG. 1, height control can be achieved by making the sleeve with headrest adjustable vertically with a suitable arrangement, e.g. so that the sleeve is released by lateral displacement to be held in place by friction alone or by snaps.

Within the scope of the present invention, other embodiments are of course conceivable than those described above. For example, the headrest can have a longer arm which is articulated at a point corresponding to that in FIG. 1 and vertically adjustable in a sleeve securely mounted on the seat back. The articulation is made so that it limits the movement to 90° and the folding forward is blocked either by friction alone or by a positive catch.

What I claim is:

1. A back seat for a station wagon, comprising a seat bottom which can be swung between a substantially horizontal position and an essentially vertical position, in which latter position the underside of the seat bottom forms the front limitation of a cargo space, and a seat back, hinged at its lower edge and which can be swung between an upright position and a forwardly directed, substantially horizontal position, in which latter position the back of the seat back forms a cargo carrying surface, said seat back has on its back mounting means for a support for a headrest, means to fix the support in a first position in which the headrest is disposed above the upper edge of the seat back, and to permit folding the support forward from said first position to a second position in which the headrest is disposed beneath the seat back when the seat back is in the forwardly folded substantially horizontal position.

2. A back seat according to claim 1, in which the support is formed of a forwardly angled arm.

3. A back seat according to claim 2, in which said mounting means comprise a sleeve fixed to the back of said seat back, said arm having an articulation and being slidably arranged in the sleeve so that the articulation is inside said sleeve in said first position and outside said sleeve in said second position.

4. Back seat according to claim 3, in which the arm is loaded by a tension spring in the sleeve, said spring having one end fixed in the sleeve and one end fixed to the arm at a point above the articulation.

5. Back seat according to claim 2, in which said mounting means comprise a pivot shaft connected to said arm and about which the arm pivots between said first and said second positions, and manually releasable locking means to fix said arm in the first position.

* * * * *